(12) United States Patent
Taubin et al.

(10) Patent No.: US 8,036,305 B2
(45) Date of Patent: Oct. 11, 2011

(54) PRECODER DESIGN FOR DIFFERENT CHANNEL LENGTHS

(75) Inventors: Felix Aleksandrovich Taubin, St. Petersburg (RU); Sergey Valentinovich Bulatnov, Leningradskaya (RU)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 11/992,784

(22) PCT Filed: Sep. 30, 2005

(86) PCT No.: PCT/RU2005/000491
§ 371 (c)(1),
(2), (4) Date: Feb. 12, 2010

(87) PCT Pub. No.: WO2007/037715
PCT Pub. Date: Apr. 5, 2007

(65) Prior Publication Data
US 2010/0150264 A1    Jun. 17, 2010

(51) Int. Cl.
*H04L 25/49* (2006.01)
(52) U.S. Cl. ...................................... 375/296
(58) Field of Classification Search .............. 375/285, 375/295–296, 358; 455/114.2, 114.3, 115.1, 455/115.2, 126
See application file for complete search history.

(56) References Cited

U.S. PATENT DOCUMENTS

| | | | |
|---|---|---|---|
| 6,243,425 B1 * | 6/2001 | Langberg et al. | 375/285 |
| 6,324,220 B1 * | 11/2001 | Sellars | 375/296 |
| 6,732,315 B2 | 5/2004 | Yagil et al. | |
| 6,928,047 B1 * | 8/2005 | Xia | 370/206 |
| 6,928,107 B1 * | 8/2005 | Olafsson et al. | 375/219 |
| 7,242,724 B2 * | 7/2007 | Alexiou et al. | 375/267 |
| 7,257,181 B2 | 8/2007 | Jones et al. | |
| 7,486,739 B2 | 2/2009 | Hottinen et al. | |
| 7,512,191 B2 | 3/2009 | Laamanen et al. | |
| 7,616,701 B2 | 11/2009 | Ungerboeck | |
| 2003/0185310 A1 * | 10/2003 | Ketchum et al. | 375/259 |
| 2004/0028155 A1 | 2/2004 | Dornstetter et al. | |
| 2004/0233981 A1 * | 11/2004 | Porter et al. | 375/229 |
| 2009/0274239 A1 | 11/2009 | Efimov et al. | |
| 2010/0226422 A1 * | 9/2010 | Taubin et al. | 375/231 |

FOREIGN PATENT DOCUMENTS

WO   WO-9837671 A   8/1998

(Continued)

OTHER PUBLICATIONS

Li, Y., et al., "Optimum soft-output detection for channels with intersymbol interference", *IEEE Transactions on Information Theory*, 41(3), (May 1995), 704-713.

(Continued)

*Primary Examiner* — Khanh C Tran
(74) *Attorney, Agent, or Firm* — Schwegman, Lundberg & Woessner, P.A.

(57) ABSTRACT

Apparatus and methods construct parameters for a unit associated with a precoder to a channel. Embodiments include forming a plurality of values for precoder constructions, where the values may be obtained from applying a transmission quality criterion to each precoder construction for varying channels lengths. Each precoder construction may be built for a predetermined channel length with a different channel length for each precoder construction. A subset of the precoder constructions operate substantially over the entire distance range covered by the varying channels lengths.

29 Claims, 4 Drawing Sheets

FOREIGN PATENT DOCUMENTS

| WO | WO-9837671 A1 | 8/1998 |
|---|---|---|
| WO | WO-2006073326 | 7/2006 |
| WO | WO-2006073326 A1 | 7/2006 |
| WO | WO-2007001205 A1 | 1/2007 |
| WO | WO-2007037715 A1 | 4/2007 |

OTHER PUBLICATIONS

Brown, C., et al., "Effects of Training Sequence Length and Precoder Update Duration over a Fading Channel in the MMDS Band", *Personal, Indoor and Mobile Radio Communications*, 1, (Sep. 18, 2000),595-598.

Forney, G. D., "Maximum-Likelihood Sequence Estimation of Digital Sequences in the Presence of Intersymbol Interference", *IEEE Transactions on Information Theory, IEEE Service Center*, vol. IT-18, No. 3, (May 1, 1972),363-378.

Mertins, A., "Design of Filterbank Transceivers for Dispersive Channels with Arbitrary-Length Impulse Response", *Journal of telecommunications and Information technology,*, (Feb. 2003),11-16.

Mertins, A., "Design of Redundant FIR Precoders for Arbitrary Channel Lengths Based on an MMSE Criterion", *ICC 2002, International conf. on communications, 1 of 5*, (Apr. 28, 2002),212-216.

Mertins, A., "MMSE Design of Redundant FIR Precoders for Arbitrary Channel Lengths", *IEEE Transactions on Signal Processing, [see also Acoustics, Speech, and Signal Processing, IEEE Transactions on]*, 51(9), (Sep. 2003),2402-2405.

Proakis, John G., *Digital Communications*, New York : McGraw-Hill, 4th ed.,(2000),598-658.

Ungerboeck, Gottfried, "10GBASE-T Cable characteristics, front-end solutions, and precoders", *IEEE P802.3an Task Force Meeting*, (Mar. 2005),1-39.

Ungerboeck, Gottfried, "10GBASE-T Modulation & Coding, Set of Fixed Precoders, and Start-up", *IEEE P802.3an Task Force Meeting*, (Nov. 2004),1-29.

Vareljian, Albert, "Fixed Set FIR Transfer Functions for 10GBASE-T THP", *IEEE P802.3an Task Force Meeting*, (Jan. 20, 2005),1-7.

\* cited by examiner

PRECODER DESIGN FOR DIFFERENT CHANNEL LENGTHS

RELATED APPLICATION(S)

This application is a U.S. National Stage Filing under 35 U.S.C. 371 from International Patent Application Serial No. PCT/RU2005/000491, filed Sep. 30, 2005, and published on Apr. 5, 2007 as WO 2007/037715 A1, which is incorporated herein by reference. This application is related to the following, co-pending, commonly assigned applications: PCT Application no. PCT/RU2004/000538, entitled: "PRESCRIBED RESPONSE PRECODING FOR CHANNELS WITH INTERSYMBOL INTERFERENCE," filed 30 Dec. 2004, and PCT Application no. PCT/RU2005/000359, entitled: "PRECODER CONSTRUCTION AND EQUALIZATION," filed 29 Jun. 2005.

TECHNICAL FIELD

Embodiments of the invention relate generally to precoders for communication channels.

BACKGROUND

Channels in a communication network may typically experience channel distortion. This channel distortion may result in intersymbol interference (ISI), which essentially is the spreading of a signal pulse outside its allocated time interval causing interference with adjacent pulses. If a communication channel is uncompensated with respect to its intersymbol interference, high error rates may result. Various methods and designs are used for compensating or reducing intersymbol interference in a signal received from a communication channel. The compensators for such intersymbol interference are known as equalizers. Various equalization methods include maximum-likelihood (ML) sequence detection, linear filters with adjustable coefficients, and decision-feedback equalization (DFE). To provide higher-speed reliable data communication what is needed are enhanced schemes for providing channel equalization, which at the same time can be implemented without a significant amount of complexity.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the present invention. Other embodiments may be utilized and structural, logical, and electrical changes may be made without departing from the scope of the invention. The various embodiments disclosed herein are not necessarily mutually exclusive, as some disclosed embodiments can be combined with one or more other disclosed embodiments to form new embodiments. The following detailed description is, therefore, not to be taken in a limiting sense, and the scope of the embodiments of the present invention is defined only by the appended claims, along with the full scope of equivalents to which such claims are entitled.

Figure 1:
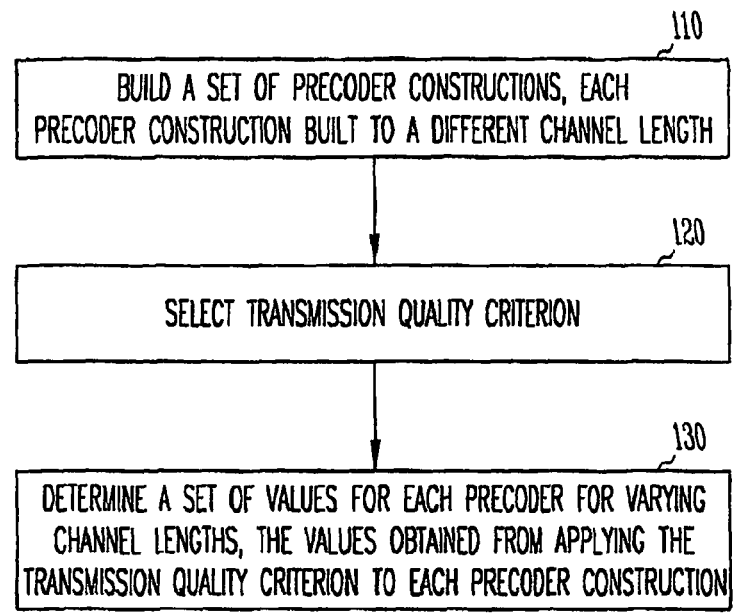
FIG. 1 illustrates a flow diagram of features of an embodiment of a method to provide a precoder having filter characteristics for any channel length within a relatively wide distance range.

FIG. 1 illustrates a flow diagram of features of an embodiment of a method to provide a precoder having filter characteristics for any channel length within a relatively wide distance range. At 110, a set of precoder constructions are built. Each precoder construction may be built to a specific channel length in which the specific length for a precoder construction is different from the other precoders in the set. The specific lengths may be chosen to cover a wide distance range for a communication channel. The distance range may be set to a value that extends to a maximum distance for the medium used for the channel. The specific channel lengths are less than or equal to the distance range. In an embodiment, a distance range in divided into a number of equally spaced distances and a precoder construction may be made for each distance. For example, the distance range may be 100 meters with specific distances separated by 10 meters for which 10 precoders are constructed, one for each of channel lengths 10 m, 20 m, . . . 100 m, respectively. The distance range is not limited to 100 m and the specified distances are not limited to spacing of 10 meters. In an embodiment, the specific distances with a distance range may be selected such that the distance between specific distances varies over the distance range, that is, in an embodiment, the specific distances may not be equally spaced apart.

At 120, a transmission quality criterion may be selected. In an embodiment, several transmission quality criteria may be stored in a memory. In an embodiment, a single transmission quality criterion may be stored in a memory. The transmission quality criterion may be a mean square value of the error (MSE) criterion associated with an information symbol transmitted and an estimate of the information at a point in a unit of the communication channel. The estimate may be taken an output of an equalizer.

At 130, a set of values may be determined for each precoder constructed. The set of values may be generated for varying lengths for each precoder by applying the selected transmission quality criterion. In an embodiment, for a set of N precoders, $N^2$ values may be generated. Each of the N values for a given precoder may indicate the performance of the precoder for each of N channel lengths based on the quality criterion, though each precoder is constructed for one of the N channel lengths. A subset of precoders may then be selected in which the performance of the precoders is within a specific range of values generated by application of the transmission quality criterion. One or more precoders may be selected to provide the effective precoder over the distance range.

Figure 2:
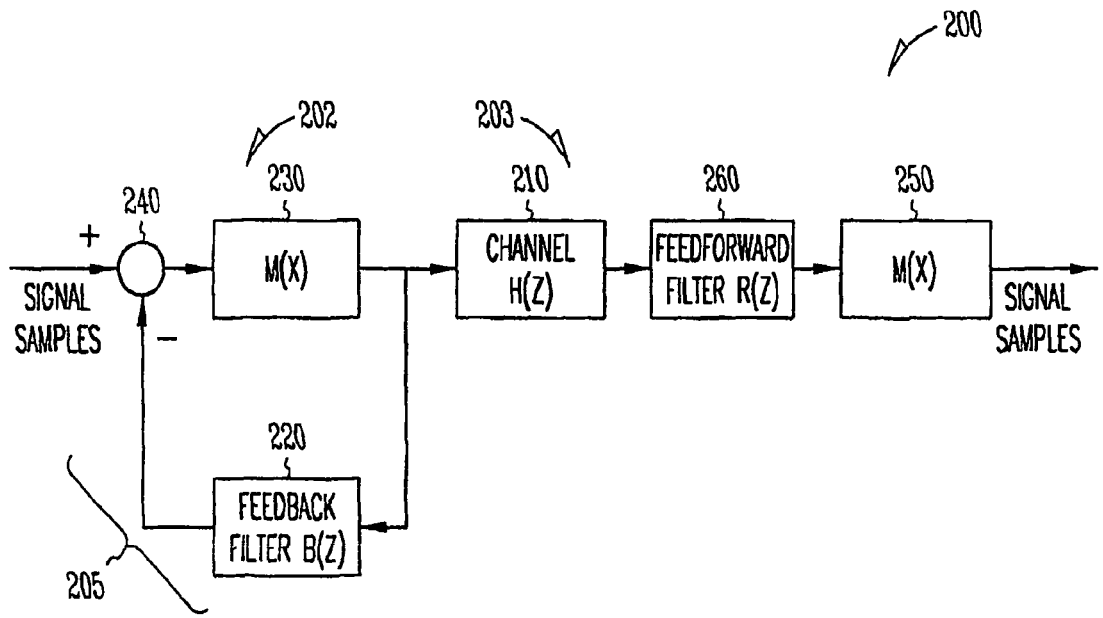
FIG. 2 illustrates a network that includes an embodiment of a precoder configured based on characteristics of a Tomlinson-Harashima precoder having filter characteristics to operate for any channel length within a relatively wide distance range.

FIG. 2 illustrates a network 200 that includes an embodiment of a precoder configured based on characteristics of a Tomlinson-Harashima precoder (THP) having filter characteristics to operate for any channel length within a relatively wide distance range. The precoder may be constructed in an embodiment similar to that described with respect to FIG. 1. Tomlinson-Harashima precoding provides for implementation of a feedback filter at the transmitter end of the communication channel with a mechanism to limit output signal amplitude. Signal samples transmitted in channel 210 between node 202 and node 203 are subjected to a feedback filter 220 defined by a polynomial B(z) and a modulo reduction function, M(x), 230 to avoid overflowing the signal bounds. Modulo reduction function 230 is a modulo operation to limit the amplitude of the signals to be transmitted into channel 210. The feedback loop is closed with feedback filter 220 coupled back to a summer 240 that receives the signal samples. At the receive end of the communication channel, a feedforward filter 260 defined by polynomial R(z) receives the transmitted symbols and provides a filtered signal to a receive modulo reduction function 250 that maps the signal to symbol estimates in an operation effectively inverse to map reduction function 230. For a given THP, two filter units are associated with the precoder, a feedback filter at a transmit end of a channel and a feedforward filter at a reception end of a channel.

A Tomlinson-Harashima precoder is to be the part of an Institute of Electrical and Electronics Engineers (IEEE) standard, IEEE 802.3an standard. In a draft, Draft P802.3an/D2.1, of IEEE standard Ethernet 802.3an for 10GBASE-T having a formal expiration date of 21 Jul. 2005, use of a fixed set of Tomlinson-Harashima precoders for channel equalization during transmission over cables of different lengths was indicated. The number of precoders in the precoder set is not defined, but the range is approximately from 4 to 8 fixed precoders. In contrast to measuring the channel impulse response and optimally tuning precoder filters for this response before transmission, there will be a set of THP filters coefficients for all transmission conditions. This means that, during initialization, network cards for 10GBASE-T may estimate the channel, but the precoders may not be constructed using the channel estimate. The precoders will be selected as the one of the predefined set of the precoders.

In a classical THP scheme for a given channel length, feedforward R(z) and feedback B(z) precoder filters are chosen to minimize MSE at precoder output given some channel impulse response H(z). M(x) denotes the modulo operator, which for the case of M-PAM with signal distance d is given by $$M(x) = x - Md \left\lfloor \frac{x + \frac{Md}{2}}{Md} \right\rfloor$$

In an embodiment, an approach to constructing a fixed set of THP feedforward filters may provide THP characteristics for channel lengths within a relatively wide distance range. In an embodiment, such an approach also provides an algorithm to generate a fixed set of THP feedforward filters selected for arbitrary cable types. In order to reduce the amount of computations during transmission, precoder filters may be precomputed and stored in a table. The task of choosing a fixed set of precoder filters involves an optimization process. Such a set of precoder filters should be suitable to maintain transmission quality at desired level for varying cable lengths. In an embodiment, the optimization target unction for measuring the quality of fixed THP sets may be chosen as a mean square error (MSE) increase at the output of the feedforward filter for the precoder. The MSE increase may be determined for a set of cable lengths over a distance range. For example, the MSE increase may be determined for each cable length between 0 and 100 m taken, every 5 m. Embodiments are not limited to a range between 0 and 100 m with a sampling length of 5 m. Various embodiments may use different ranges for cable lengths and different sampling lengths. MSE may be chosen to compare equalization schemes since it is a classical measure of equalization quality. The MSE should increase when a suboptimal feedback or feedforward filter is used for a channel length in comparison with using an optimal feedback, and feedforward filter constructed as a minimum MSE THP filters. That is, the MSE increase should be minimum at the channel length for which the precoder was constructed.

In an embodiment, for each channel length selected over a distance range, a precoder may be constructed such that the set of constructed precoders is sufficient to provide required SNR level at decision point for arbitrary cable length. A precoder may be built a length k within a maximum length D and checked to determine that the precoder provides the required SNR level at decision point for arbitrary cable length less than or equal to D.

In an embodiment, a table of average MSE values at precoder outputs may be computed to find optimal fixed set of THP feedforward filters. An entry (i,k) of such a table may contain an average MSE of precoder i with a channel length associated with precoder k. Consider a distance range of 100 m with channel lengths specified with a 5 m spacing. A table may be generated as a 20×20 table. The (i,k) field may be obtained by combination of feedforward filter $R_i(z)$, optimized for length 5*i, with channel response $H_k(z)$ of length 5*k. The corresponding THP feedback filter is obtained by convolution of $R_i(z)$ and $H_k(z)$, written as $R_i(z)*H_k(z)$. For the case of i=k, the resulting precoder is optimal for this channel and its average MSE is minimal among precoders in the same column of the table, since the precoders at the other channel lengths include suboptimal feedforward filters.

Figure 3:
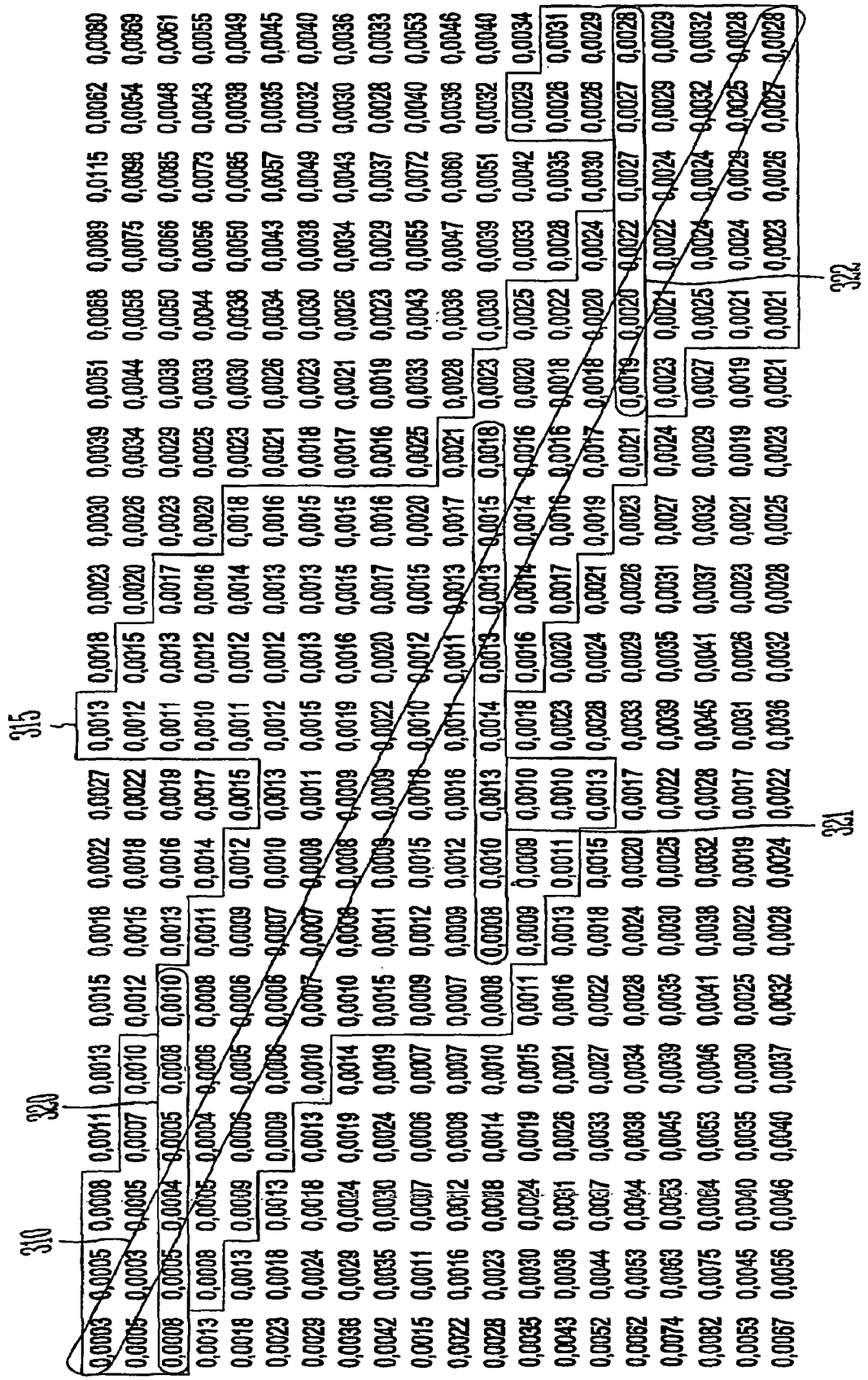
FIG. 3 depicts an embodiment in which a table of precoder characteristics over a range of channel lengths is generated using a quality criterion applied to a set of precoders, where each precoder is constructed relative to a specific channel length different from the other precoders.

FIG. 3 depicts an embodiment in which a table of precoder characteristics (MSE increase at the output of the feedforward filter of the precoder) over a range of channel lengths (every 5 m over the 100 m range) for use in determining appropriate filter parameters over the distance range of 100 m. In the example of FIG. 3, determination of precoder MSE for all combinations of feedforward and feedback filters optimized for some length (row number) with channel impulse response (IR) for cable with another length (column number) uses a SNR of 45 db at the transmitter. To construct a fixed feedforward filter set, a criterion based on the MSE increase may be applied. The construction may be generated through simulation techniques. A MSE degradation may be applied, where the MSE degradation is an amount of variation of the MSE increase from the optimal MSE increase. In an embodiment, an acceptable amount of MSE degradation may depend on the required SNR at a slicer in the system. As a rough guide, MSE degradation may be considered as additional noise at the slicer input with respect to the ideal case of a specific filter for each channel length. Other means for selecting a MSE degradation may be applied.

Given an acceptable MSE degradation is chosen, all table entries that lie within the specified MSE degradation, or gap, from the optimal MSE increase are identified. The optimal MSE increase for each channel length are the table entries 310 along the main diagonal of the table. In the example table shown in FIG. 3, the specified MSE gap from main diagonal is selected to be less than or equal to 0.0005. The gap may be applied to values in each column k relative to the (k,k) entry. The identified entries (i,k) that are within the specified gap are shown enclosed in the region 315. In an embodiment, the specified MSE gap may be chosen as a minimal MSE increase with respect to a given application.

From the subset of table values identified as region 315, a set of row intervals (horizontal rows indicated by regions 320, 321, and 322) may be identified. These regions 320, 321, and 322 do not intersect, that is, each region covers a different channel length. The combination of the regions 320, 321, and 322 cover all cable lengths range in the table. The regions 320, 321, and 322 lie within the marked table area 315 and thus are within the MSE degradation. In such a process of finding the set of row intervals, that is, the whole set of points covering the distance range with the specified gap, may be used to determine the fewest number of filters within the minimum MSE gap (sum of the cells covered). Each horizontal row indicated by regions 320, 321, and 322 corresponds to a filter set. As noted, each row interval 320, 321, and 322 corresponds to a specific interval of channel length such that these specific intervals of channel length do not intersect. For each specific interval, a specific filter may be found. Alternatively, given the selected MSE degradation and values of the (i,j) entries, the fewest number of filters may be solved as an optimization task using conventional techniques. As shown in FIG. 3, the combination of regions 320, 321, and 322 cover the entire distance range, which is 100 meters in this example, providing 3 fixed feedforward filters for the given channel model used in this example. The smaller the acceptable MSE degradation selected, the larger the number of feedforward filters that may be chosen to fulfill this criterion. In an embodiment, with each feedforward filter there may be an associated feedback filter to establish the Tomlinson-Harashima precoder.

Figure 4:
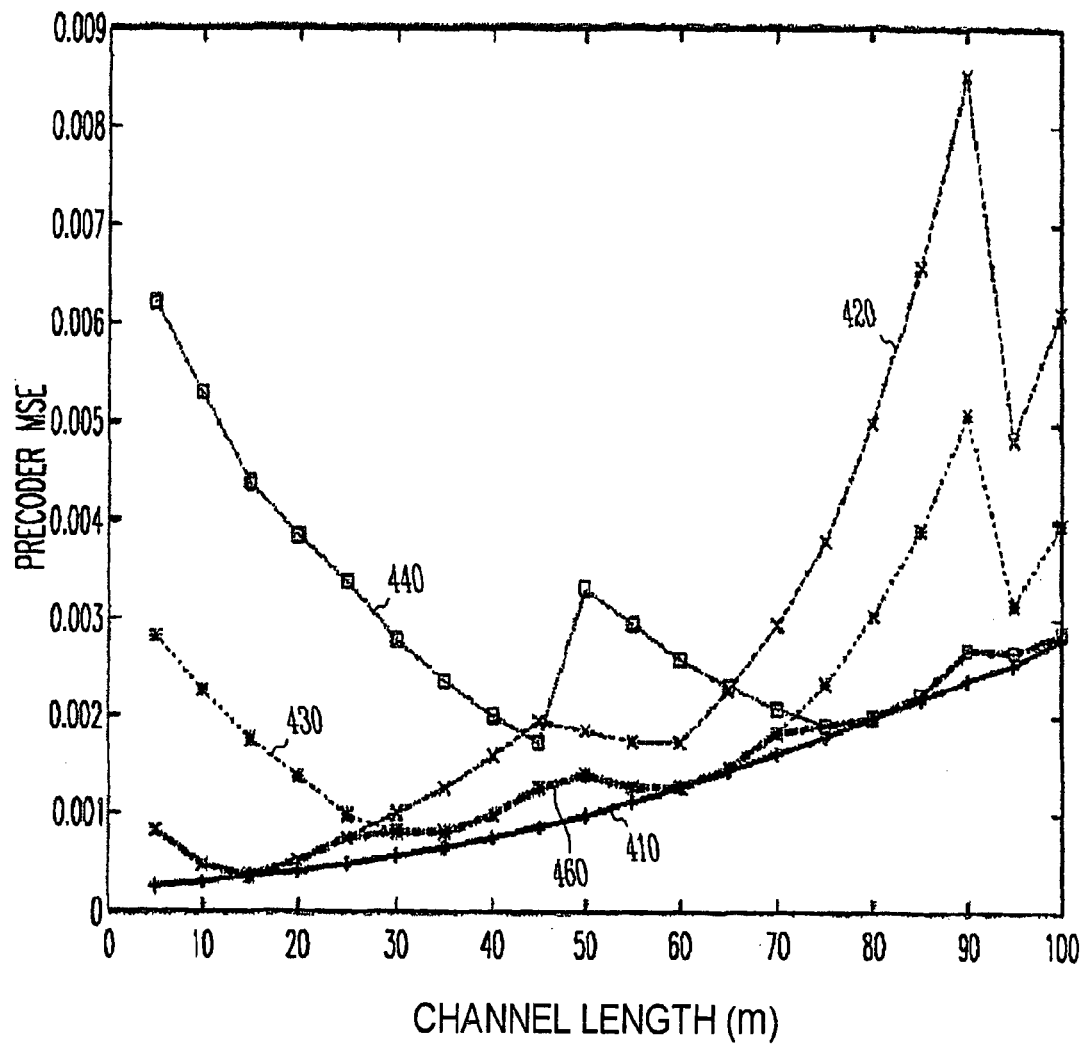
FIG. 4 illustrates a simulation of the performance of an embodiment generated from application of the table in FIG. 3.

FIG. 4 illustrates a simulation of the performance of an embodiment generated from application of the table in FIG. 3. FIG. 4 provides a comparison of precoder MSE for some combinations of fixed THP feedforward filters and different channels with optimal MSE at precoder output. In the calculations and simulations for FIGS. 3 and 4, a channel model for a variable-length 10GBASE-T cable model was used for an 800 MHz sampling rate. There are only 3 fixed feedforward filters used to cover all cable lengths region having with approximately $5 \times 10^{-4}$ largest absolute MSE degradation. Curve 410 shows the optimal MSE associated with the feedforward filter constructed for each specified length in the distance range of 100 m, spaced every 5 m. Curve 410 corresponds to the diagonal of the table of FIG. 3. Curve 420 represents the precoder MSE using a 15 m feedforward filter and associated feedback filter. The filter set having curve 420 may be selected as a result of the process described above resulting in identifying region 320 (row 3) of FIG. 3. Curve 430 represents the precoder MSE using a 60 m feedforward filter and associated feedback filter. The filter set having curve 430 may be selected as a result of the process described above resulting in identifying region 321 (row 12) of FIG. 3. Curve 440 represents the precoder MSE using a 80 m feedforward filter and associated feedback filter. The filter set having curve 440 may be selected as a result of the process described above resulting in identifying region 322 (row 16) of FIG. 3. In an embodiment, for a channel model as used in this example, a feedforward filter constructed for 15 m may be used for the channel lengths from 5 m to 30 m, a feedforward filter constructed for 60 m may be used for the channel lengths from 35 m to 70 m, and a feedforward filter constructed for 80 m may be used for the channel lengths from 75 m to 100 m. The three feedforward filters, and their associated feedback filters, effectively provide a mixed feedforward filter (and associated mixed feedback filter) having the precoder MSE shown in curve 460. Curve 460 corresponds to the combination of the 3 filter sets applied individually for the distances specified above. At a receiver having a feedforward filters determined in an embodiment as described herein, the receiver may select the appropriate feedforward filter, with the channel length as known information at the receiver. In an embodiment, the receiver may use a lookup table to select the filter corresponding to the channel length for the application in which the receiver is configured. A filter may be stored in a table as filter parameters. The filter parameters may be provided to the receiver from another system. The filter parameters may be determined in the receiver.

For the example discussed with respect to FIGS. 3 and 4, three fixed feed forward filters were identified. Having identified the filters corresponding to 15 m, 60 m, and 80 m, the filter taps for this filters may be determined. The filer taps for the 15 m feedforward filter may be generated, starting with the $0^{th}$ tap, as

| | | | | | |
|---|---|---|---|---|---|
| 0.0010568 | 0.90393 | 5.1849 | −0.55563 | −0.21668 | 0.32656 |
| −0.3287 | 0.31644 | −0.30294 | 0.28848 | −0.27302 | 0.25758 |
| −0.24316 | 0.23015 | −0.21818 | 0.2068 | −0.19572 | 0.185 |
| −0.17476 | 0.16513 | −0.15604 | 0.14742 | −0.13919 | 0.13131 |
| −0.12377 | 0.1166 | −0.10977 | 0.10327 | −0.097039 | 0.091086 |
| −0.085374 | 0.079915 | −0.074682 | 0.069676 | −0.06485 | 0.060197 |
| −0.055684 | 0.051348 | −0.047188 | 0.043223 | −0.039368 | 0.035545 |
| −0.031675 | 0.02786 | −0.024286 | 0.021127 | −0.018237 | 0.015104 |
| −0.011235 | 0.0066318 | −0.0024947 | | | |

The filer taps for the 60 m feedforward filter may be generated, starting with the $0^{th}$ tap, as

| | | | | | |
|---|---|---|---|---|---|
| 0.0061942 | 2.0446 | 14.322 | 6.0033 | −5.5359 | 3.0208 |
| −1.4236 | 0.76024 | −0.53161 | 0.38358 | −0.21504 | 0.068469 |
| 0.010327 | −0.023274 | 0.0066003 | 0.0082314 | −0.0096154 | 0.0032657 |
| 0.002648 | −0.0039158 | 0.0021412 | 0.00010252 | −0.00091973 | 0.00066031 |
| 2.2988e−005 | −0.00030191 | 0.0002829 | −3.6004e−005 | −6.2882e−005 | 0.00010361 |
| −1.3418e−005 | −5.1314e−006 | 4.2621e−005 | −1.9384e−007 | 8.6588e−006 | 2.0678e−005 |
| 5.9795e−006 | 1.05686e−005 | 1.2534e−005 | 8.3799e−006 | 1.013e−005 | 8.1385e−006 |

-continued

| | | | | | |
|---|---|---|---|---|---|
| 1.1329e−005 | 6.7573e−006 | 8.4246e−006 | 9.2458e−006 | 1.5389e−005 | −1.80486−005 |
| 5.861e−005 | −5.2158e−005 | 5.13e−005 | | | |

The filer taps for the 80 m feedforward filter may be generated, starting with the $0^{th}$ tap, as

| | | | | | |
|---|---|---|---|---|---|
| 0.0073129 | 1.6101 | 13.716 | 18.518 | −3.9488 | −3.0913 |
| 2.6921 | −0.70451 | −0.045169 | −0.23549 | 0.51951 | −0.38377 |
| 0.064728 | 0.11959 | −0.10141 | 0.0089075 | 0.040507 | −0.027633 |
| −0.0026511 | 0.015471 | −0.0084476 | −0.0018329 | 0.0053052 | −0.0023329 |
| −0.00093068 | 0.0017969 | −0.00058263 | −0.00039768 | 0.00061223 | −0.0001161 |
| −0.00014413 | 0.00021486 | −1.178e−006 | −3.9788e−005 | 8.3339e−005 | 2.1937e−005 |
| −5.5834e−007 | 3.9328e−005 | 2.3647e−005 | 1.3935e−005 | 2.2124e−005 | 2.2571e−005 |
| 2.1065e−005 | 1.123e−005 | 2.0632e−005 | 3.4777e−005 | −4.2873e−006 | 1.7908e−006 |
| 0.000119 | −0.00014355 | 0.00014849 | | | |

Filters constructed for a relatively wide distance range according to various embodiments provide reduced computation and memory use during initialization procedures associated with a receiver and the communication channel to which the receiver may be coupled, since a fixed set of filters may be stored for a given channel model. Setting the filters at initialization may become a function of accessing a table to obtain and apply filter parameters correlated to specific distance intervals. Filters constructed in such a manner may be used in 10 Gigabit Ethernet apparatus and systems. In an embodiment, a fixed set of filters constructed using a quality of transmission criterion may be used for of category 6 cables and category 7 cables. Such filters may also be implemented other high speed communication-oriented applications.

Network 200 of FIG. 2 may include other apparatus and systems for communicating between network nodes 202 and 203. Each node may receive and transmit information. Network nodes may each include a number of systems that may effectively be coupled to a precoder as in FIG. 2 to communicate over channel 210. Systems at these nodes may, provide one or more functions at a node. A nodal system may direct operations of other systems and/or apparatus at the node. Systems at each network node (202, 203) may include external connections to each other that are wired or wireless. In an embodiment, nodal systems may be realized as a switch, a router, a computer, a server, or combination of these elements. Further, nodal systems may couple to each other or other apparatus at a node over a medium that is compatible with Peripheral Component Interconnect (PCI) or with PCI express.

The network nodes (202, 203) each may represent processing systems having a physical layer (PHY) entity arranged to operate in accordance with 10GBase-T as defined by the IEEE 802.3an series of standards, for example. The 10GBase-T PHY may interface with, for example, a 10G media access control (MAC) and Gigabit Media Independent Interface (XGMII) in the IEEE architecture. The 10GBase-T PHY may include part of a network interface card (NIC), for example. Nodes (202, 203) may include any processing system and/or communications device suitable for use with a 10GBase-T device. For example, node pair (202, 203) may be implemented as a pair of switches, a pair of routers, a pair of servers, a switch and a router, a switch and a server, a server and a router, and so forth. In addition, nodes (202, 203) also may be part of a modular system in which 10GBase-T is the high-speed connection for the system. Further, examples for nodes (202, 203) may include high-end servers, supercomputers, clusters, grid computing, workgroup switch uplinks, aggregation uplinks, storage systems, and so forth. The embodiments are not limited in this context.

Various embodiments or combination of embodiments for apparatus and methods for constructing parameters associated with a precoder to a channel may be realized in hardware implementations, software implementations, and combinations of hardware and software implementations. Constructing parameters for units associated with a precoder may include selecting a transmission quality criterion, and forming a plurality of values for a plurality of precoder constructions, where each precoder construction may be built for a predetermined channel length that is different for each precoder construction in which the predetermined channel lengths together cover a relatively wide distance range. The values may be obtained from applying the transmission quality criterion to each precoder construction for varying channels lengths. A subset of the values may be used to determine a limited number of precoder constructions that may be used over the distance range based on deviation of the selected quality criteria for varying distances relative to the specified channel length for each precoder construction. These implementations may include a computer-readable medium having computer-executable instructions for performing various embodiments similar to embodiments discussed herein. The computer-readable medium is not limited to any one type of medium. The computer-readable medium used will depend on the application using an embodiment.

Figure 5:
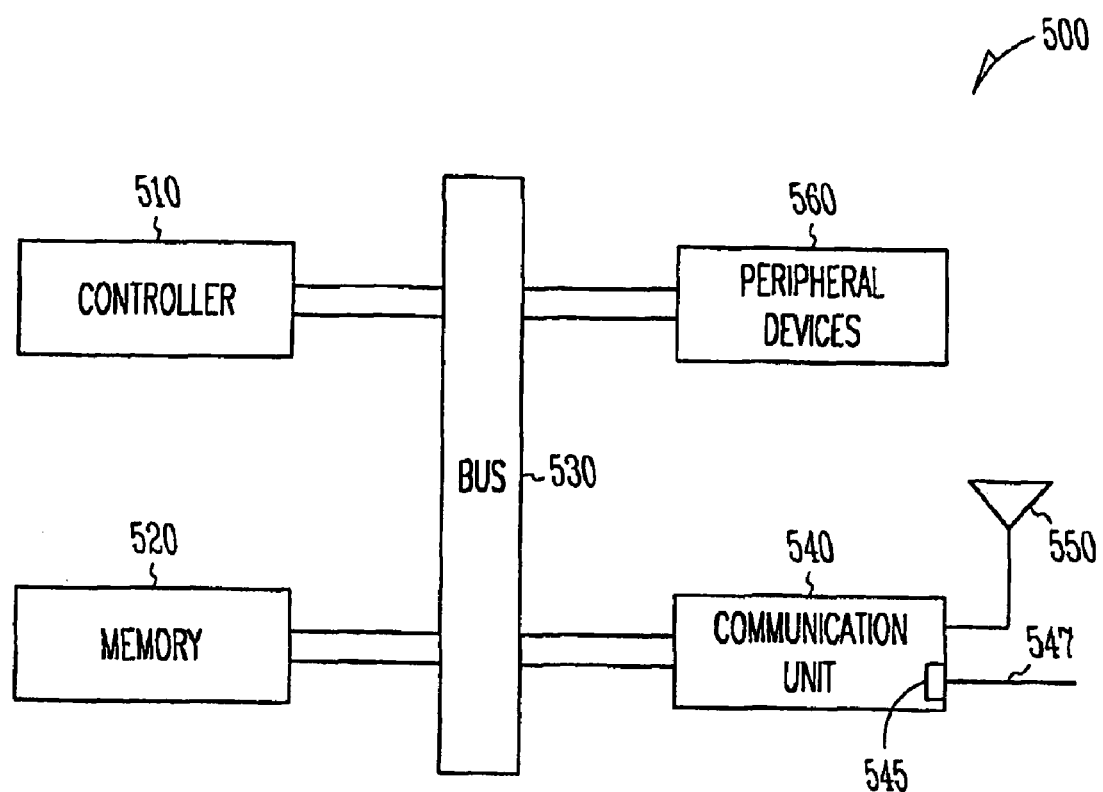
FIG. 5 illustrates a block diagram of an embodiment of a system having an embodiment of a precoder having filter characteristics for any channel length within a relatively wide distance range.

FIG. 5 illustrates a block diagram of an embodiment of a system 500 having an embodiment of a unit associated with a precoder. The unit may include a filter such that, at an output of a feed forward filter at a receive end, a mean square error increase is within a selected value for varying channel lengths over a distance range. The MSE increase at the output of the feed forward filter may be due to a coupling with a channel having a length different from a length to which the precoder is constructed. The feedforward filter may be selected from fixed feedback filters in a table in which each of the fixed feedback filters is correlated to a specific distance interval within a distance range. The specific distance intervals may be non-overlapping. The unit may be located at the receive end of a communication channel and include the feedforward filter. The unit may be located at the transmit end of a communication channel and include a feedback filter associated with the feedforward filter. The precoder may be a Tomlinson-Harashima precoder.

System 500 may include a controller 510, a memory 520, and a bus 530, where bus 530 provides electrical connectivity between controller 510 and memory 520 and between controller 510 and a communication unit 540. Bus 530 may be a parallel bus. Bus 530 may be a serial bus. Communication unit 540 may include an embodiment of a precoder for a wide distance range of channel lengths similar to the schemes discussed with respect to FIGS. 2-4, or combinations of these embodiments. Communication unit 540 may couple to a wired network or a wireless network. Alternatively, communication unit 540 may include a network interface to couple to a wired network and to a wireless network. A wired network may include a network having wire channels, fiber optic channels, and/or co-axial channels.

An embodiment may include an additional peripheral device or devices 560 coupled to bus 530. Bus 530 may be compatible with PCI or with PCI express. In an embodiment, communication unit 540 may include a network interface card. In an embodiment, communication unit 540 may include a communications device suitable for use with a 10GBase-T device. Communication unit 540 may include a connection 545 to a wired network. Connection 545 may be configured to connect to a cable 547. Connection 545 may be configured to connect to an unshielded twisted pair cable. Connection 545 may be configured to connect to a shielded twisted pair cable. In a wireless embodiment, communication unit 540 may be coupled to an antenna 550. In an embodiment, antenna 550 may be a substantially omnidirectional antenna. System 500 may include, but is not limited to, information handling devices, wireless systems, telecommunication systems, fiber optic systems, electro-optic systems, and computers.

In an embodiment, controller 510 is a processor. Memory 520 may include any form of computer-readable medium that has computer executable instructions to provide a fixed set of feedforward filters and/or to select the appropriate filter from a table of fixed filters dependent on the channel length coupled to communication unit 540. Peripheral devices 560 may also include displays, additional storage memory, or other control devices that may operate in conjunction with controller 510. Alternatively, peripheral devices 560 may include displays, additional storage memory, or other control devices that may operate in conjunction with controller 510, communication unit 540, and/or memory 520.

In a wireless arrangement in which the transmission medium between transmitter and receiver is relatively steady or slowly varying, the channel characteristics may be modeled or determined. With a given wireless channel model, feedback filters may be determined for specific distance intervals within a distance range in a manner similar to that of the example associated with a cable discussed with respect to FIGS. 3,4. Various embodiments for constructing feedforward filters and their associated feedback filters may be implemented for a wireless application having a relatively steady or slowly varying transmission medium.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description.

What is claimed is:

1. A method comprising:
    forming, in a unit associated with a precoder, a plurality of values for a plurality of precoder constructions, each precoder construction built for a predetermined channel length, a different channel length for each precoder construction, the values obtained from applying a mean square error criterion to each precoder construction for varying channel lengths such that a mean square error increase, at an output of a filter of the precoder construction, due to coupling with a channel having a length different from the predetermined channel length of the respective precoder construction, is within a selected value.

2. The method of claim 1, wherein the selected value is based on a predetermined signal to noise ratio.

3. A method comprising:
    forming a plurality of values for a plurality of precoder constructions, each precoder construction built for a predetermined channel length, a different channel length for each precoder construction, the values obtained from applying a transmission quality criterion to each precoder construction for varying channel lengths, wherein forming a plurality of values includes using a mean square error increase at a feed forward filter output of a Tomlinson-Harashima precoder to form the plurality of values.

4. The method of claim 1, wherein the method includes generating the precoder constructions to cover a distance range, the distance range divided into a plurality of lengths, each length equal to one of the predetermined channel lengths.

5. The method of claim 4, wherein the method includes dividing the distance range into a plurality of equally spaced-apart distances.

6. A method comprising:
    forming a plurality of values for a plurality of precoder constructions, each precoder construction built for a predetermined channel length, a different channel length for each precoder construction, the values obtained from applying a transmission quality criterion to each precoder construction for varying channel lengths, wherein the method includes:
    forming a table of mean square error values, each mean square error value determined at a feed forward filter output of a Tomlinson-Harashima precoder construction for one of the varying channels lengths, each Tomlinson-Harashima precoder construction corresponding to one of the predetermined channel lengths;
    selecting a mean square error degradation; and
    determining, for the varying channel lengths, a subset of mean square error values from the table such that the mean square error values of the subset are within the mean square error degradation from the mean square error for the Tomlinson-Harashima precoder construction at its predetermined length.

7. The method of claim 6, wherein the method includes generating a set of fixed precoder filters from the precoder constructions using the subset of mean square error values.

8. The method of claim 7, wherein the method includes storing the set of fixed precoder filters in a table with each fixed precoder filter associated with a different distance interval within a distance range such that the distance intervals are non-overlapping.

9. The method of claim 7, wherein the method includes generating a mixed precoder filter as a combination of the set of fixed precoder filters.

10. A non-transitory computer-readable medium that stores instructions, which when performed by a machine, cause the machine to:

form a plurality of values for a plurality of precoder constructions, each precoder constructed to a predetermined channel length, a different channel length for each precoder construction, the values obtained from application of a mean square error criterion to each precoder construction for varying channel lengths such that a mean square error increase, at an output of a filter of the precoder construction, due to coupling with a channel having a length different from the predetermined channel length of the respective precoder construction, is within a selected value.

11. The non-transitory computer-readable medium of claim 10, wherein instructions, which when performed by a machine, cause the machine to form a plurality of values includes instructions that cause the machine to use a mean square error increase at a feed forward filter output of a Tomlinson-Harashima precoder to form the plurality of values.

12. A non-transitory computer-readable medium having instructions stored thereon, which instructions when performed by a machine, cause the machine to:

form a plurality of values for a plurality of precoder constructions, each precoder construction built for a predetermined channel length, a different channel length for each precoder construction, the values obtained from applying a transmission quality criterion to each precoder construction for varying channel lengths, wherein the instructions, which when performed by the machine, cause the machine to:

form a table of mean square error values at a feed forward filter output of Tomlinson-Harashima precoder constructions for the varying channels lengths, each Tomlinson-Harashima precoder construction corresponding to one of the predetermined channel lengths;

select a mean square error degradation; and determine, for the varying channel lengths, the set of mean square error values that are within the mean square error degradation from the mean square error for the Tomlinson-Harashima precoder construction at its predetermined length.

13. The non-transitory computer-readable medium of claim 12, wherein the method includes generating a set of fixed precoder filters from the precoder constructions using the subset of mean square error values.

14. The non-transitory computer-readable medium of claim 13, wherein the method includes generating a mixed precoder filter as a combination of the set of fixed precoder filters.

15. An apparatus comprising:

a unit associated with a precoder, the unit including a filter such that, at an output of a feed forward filter of the precoder, a mean square error increase, due to a coupling with a channel having a length different from a length to which the precoder is constructed, is within a selected value.

16. The apparatus of claim 15, wherein the apparatus includes a table containing a set of fixed filters including the filter.

17. The apparatus of claim 15, wherein the filter includes a feedback filter of a Tomlinson-Harashima precoder.

18. The apparatus of claim 15, wherein the filter includes the feedback filter.

19. The apparatus of claim 15, wherein the precoder includes a Tomlinson-Harashima precoder selected from a set of Tomlinson-Harashima precoders, each Tomlinson-Harashima precoder of the set built for a different channel length, the set to cover a predetermined distance range, the predetermined distance range larger than the different channel lengths.

20. The apparatus of claim 15, wherein the precoder includes a mixed filter having filter parameters from two or more precoders from a set of precoders, each precoder of the set built for a different channel length, the filter parameters assigned values correlated to a specific distance interval within a channel length range for the mixed filter.

21. A system comprising:

a unit associated with a precoder, the unit including a filter such that at an output of a feed forward filter, a mean square error increase, due to a coupling with a channel having a length different from a length to which the precoder is constructed, is within a selected value;

a processor communicatively coupled to the precoder-associated unit;

a parallel bus; and a memory coupled to the processor through the parallel bus.

22. The system of claim 21, wherein the unit includes a table containing a set of fixed filters including the filter.

23. The system of claim 21, wherein the filter includes a feedback filter of a Tomlinson-Harashima precoder.

24. The system of claim 21, wherein the filter includes the feedback filter.

25. The system of claim 21, wherein the precoder includes a Tomlinson-Harashima precoder selected from a set of Tomlinson-Harashima precoders, each Tomlinson-Harashima precoder of the set built for a different channel length, the set to cover a predetermined distance range, the predetermined distance range larger than the different channel lengths.

26. The system of claim 21, wherein the precoder includes a Tomlinson-Harashima precoder having filter parameters from two or more precoders from a set of Tomlinson-Harashima precoders, each Tomlinson-Harashima precoder of the set built for a different channel length, the filter parameters assigned values correlated to a specific distance interval within a channel length range for the mixed filter.

27. The system of claim 21, wherein the precoder includes a mixed filter having filter parameters from two or more precoders from a set of precoders, each precoder of the set built for a different channel length, the filter parameters assigned values correlated to a specific distance interval within a channel length range for the mixed filter.

28. The system of claim 21, wherein the system includes a network interface compatible with PCI.

29. The system of claim 21, wherein the system includes a network interface compatible with PCI express.

* * * * *